MAGNETIC RECORDING AND REPRODUCING SYSTEM WITH MECHANICAL GENERATION OF SYNCHRONIZING INFORMATION

Filed Oct. 23, 1961 4 Sheets-Sheet 1

INVENTOR.
Nobutoshi Kihara
BY
Hill, Sherman, Meroni, Gross & Simpson
ATTORNEYS

INVENTOR.
Nobutoshi Kihara
BY
Hill, Sherman, Meroni, Gross & Simpson ATTORNEYS

INVENTOR.
Nobutoshi Kihara
BY
Hill, Sherman, Meroni, Gross & Simpson
ATTORNEYS

July 27, 1965 NOBUTOSHI KIHARA 3,197,559

MAGNETIC RECORDING AND REPRODUCING SYSTEM WITH MECHANICAL GENERATION OF SYNCHRONIZING INFORMATION

Filed Oct. 23, 1961 4 Sheets-Sheet 4

INVENTOR.
Nobutoshi Kihara

BY

Hill, Sherman, Meroni, Gross & Simpson

ATTORNEYS 3,197,559

MAGNETIC RECORDING AND REPRODUCING SYSTEM WITH MECHANICAL GENERATION OF SYNCHRONIZING INFORMATION

Nobutoshi Kihara, Shibuya-ku, Tokyo, Japan, assignor to Sony Corporation, Tokyo, Japan, a corporation of Japan Filed Oct. 23, 1961, Ser. No. 146,972
Claims priority, application Japan, Oct. 25, 1960, 35/43,294
8 Claims. (Cl. 178—6.6)

This invention relates to a magnetic recording and reproducing system, and more particularly to a magnetic recording and reproducing system in which picture signals are recorded on a magnetic medium by means of a rotary magnetic head or heads scanning the medium either obliquely or substantially at right angles to the direction of movement of the record medium and are reproduced by corresponding scanning movements of a rotary magnetic head or heads.

A conventional magnetic recording system of this kind requires that synchronization be maintained between the rotary magnetic head or heads and the magnetic medium. To accomplish this, the rotary magnetic head or heads must be controlled by a servo-system. The control signals required for this servo-system during recording are usually obtained from the synchronizing component of the picture signal being recorded. Synchronizing signals are also recorded on the record medium for use during reproduction of the recorded picture signals.

During reproduction of the recorded signals, if there is a failure to pick up a portion of the picture signal itself, herein termed picture signal dropout, the induced signal resulting from the dropout acts as a picture synchronizing signal so as to interfere with proper synchronization of the reproduced picture. Further if the contact relationship between the rotary magnetic heads and the magnetic medium becomes irregular during scanning of the recorded synchronizing signals, the resulting instability of the reproduced picture synchronizing signals may lead to loss a synchronization. Thus, there is a substantial danger of loss of synchronization during the reproduction process in the conventional system.

Therefore, an object of this invention is to provide a video tape recording and reproducing system wherein the synchronization is stable and reliable during the playback operation.

Another object of this invention is to provide a video tape recording and reproducing system wherein an electric signal is generated during reproduction which is capable of serving as the synchronizing means for the reproduced picture signals, but which is not dependent on the magnetic reproduction process. By way of example, the signal may be generated by means of a device associated with the rotary shaft of the rotary magnetic heads.

Other objects, features and advantages of this invention will become fully apparent from the following description taken in conjunction with the accompanying drawings, in which.

Figure 1:
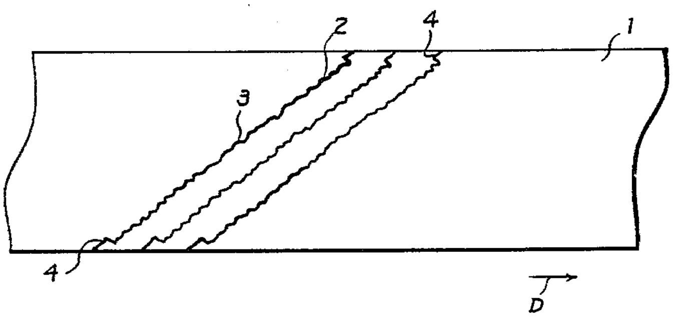
FIGURE 1 is a schematic diagram showing a magnetic tape having a video recording thereon produced by a rotary head recording and reproducing system in accordance with the present invention.

FIGURE 1 is an explanatory diagram showing an embodiment of this invention wherein magnetic tracks 2 are formed on a magnetic medium 1 obliquely to its direction of movement indicated by arrow D. Signals containing synchronizing components, for instance, picture signals are recorded along the successive tracks. As indicated in FIGURE 1, when magnetically recording and reproducing the picture signal in a television system, each magnetic track 2 may receive a frame or field of the picture signal including picture portions 3 containing horizontal synchronizing signals, and vertical synchronizing signals 4. FIGURE 1 illustrates the case where the vertical synchronizing signals 4 are arranged to be at the beginning of each magnetic track 2. In order to record the vertical synchronizing signals 4 at the beginning of each magnetic track 2, on the rotary shaft 10 of rotary magnetic heads *12a* and *12b* is mounted a rotary disk 21 the periphery of which carries portions of different light reflective properties. For example, white and black sectors *22a* and *22b* may be painted on the periphery of the disk. Light impinges on the periphery of the disk and is reflected by the white sector *22a* to a photoelectric converter 29. Thus the converter 29 delivers an electric output signal whose frequency is a function of the speed of rotation of the magnetic heads. A servo-system 60, FIGURE 6, receives the electric output signal from the converter 29 and the vertical synchronizing component of the picture signal being recorded and controls the driving system 61 for the magnetic heads to cause the successive vertical synchronizing signals to be recorded at the beginning of the successive tracks as indicated at 4 in FIGURE 1.

In conventional rotary head reproducing systems, when the reproduced picture signals are to be delivered directly to a television receiving set for example, for obtaining reproduced pictures, vertical synchronizing signals which have been recorded on the record medium with the picture signals are picked up by the rotary magnetic heads and utilized for synchronization of the receiving set. However, in the case of using thus obtained vertical synchronizing signals, the synchronization becomes unstable for the following reasons:

(1) When dropout occurs before and behind the picture signal reproduced by the rotary magnetic heads, particularly the vertical synchronizing signal, signals which are detected at the dropout portion work as vertical synchronizing signals, so that the vertical synchronization gets out of order.

(2) Since the vertical synchronizing signals are held in the side margins of the magnetic medium, the magnetic head and the magnetic medium do not make contact with each other exactly at the vertical synchronizing signal position and the vertical synchronizing signals cannot be reproduced accurately, so that the vertical synchronization becomes irregular. It occurs often particularly when the side margin gets creased or curved.

(3) Noise gets into the vertical synchronizing signal portion and the vertical synchronizing signals become unstable to cause synchronization stepout.

(4) In the case where the magnetic medium is held at a standstill and the same magnetic track is repeatedly scanned by the rotary magnetic heads thereby producing a stationary picture, the rotary magnetic heads get out of the tracks to generate noise and when this noise gets into the vertical synchronizing signals, synchronization stepout is caused.

In view of these difficulties in the conventional system, this invention proposes an improved system in which an electric output having the synchronization relationship to the picture signal on the magnetic medium is taken out from a device associated with the rotary shaft of the rotary magnetic heads and is used as the vertical synchronizing signal during reproduction.

Figure 2:
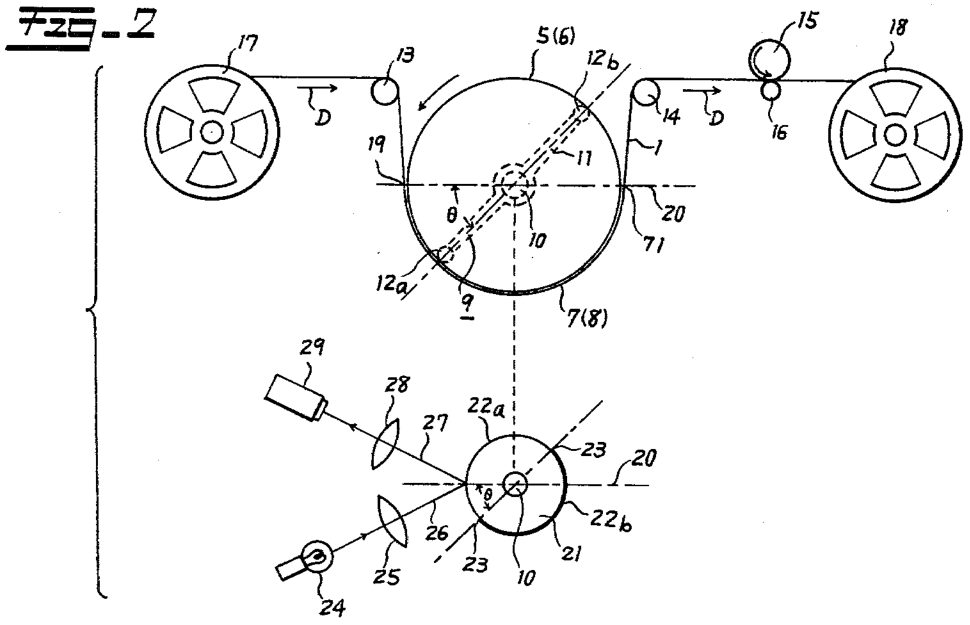
FIGURE 2 is a schematic plan view illustrating an example of a device for recording and reproducing video signals in accordance with this invention.
Figure 3:
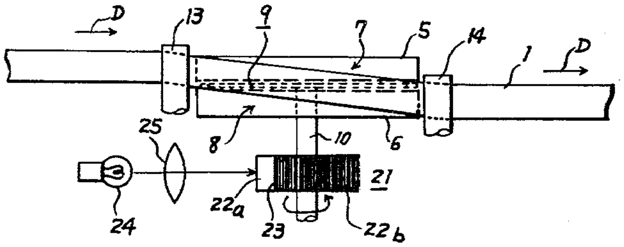
FIGURE 3 is a front view of the device of FIGURE 2.

An embodiment of the device for picking up such an electric output during reproduction is exemplified in FIGURES 2 and 3. The operation of this structure in making the recording shown in FIGURE 1 has been previously described. Reference numerals 5 and 6 designate cylindrical guide members provided with guide surfaces 7 and 8 for guiding the magnetic medium, namely the magnetic tape 1. The guide surfaces 7 and 8 are arranged so as to define a cylindrical surface having an air-gap receiving the two heads 12*a* and 12*b* of a rotary magnetic head assembly 9. The assembly 9 rotates substantially in a plane at right angles to the axis of the cylindrical surface. As shown in FIGURE 2, a rotary arm 11 is carried on the rotary shaft 10 and supports the magnetic heads 12*a* and 12*b* with their operating air-gaps at a level so as to move along the cylindrical surface between the guide surfaces 7 and 8. The magnetic tape 1 is led over the guide surfaces 7 and 8 and obliquely to the plane of rotation of the magnetic head assembly 9. In this instance, the magnetic tape 1 is guided on the guide surfaces 7 and 8 substantially over one-half the periphery thereof so that the heads contact the tape successively. Thus one magnetic head such as 12*a* contacts the magnetic tape 1 during rotation of the arm 11 through 180° after which the other head contacts the tape during travel over a 180° arc to form successive magnetic tracks 2 as shown in FIGURE 1. Reference numbers 13 and 14 are assigned to tape guide levers, 15 being a capstan roller, 16 a pinch roller, 17 a supply reel and 18 a take-up reel.

With such a structure, in the case of reproducing the picture signals 3 having the vertical synchronizing signals 4 at the beginning of the magnetic tracks 2 as illustrated in FIGURE 1, when one magnetic head element, for example, 12*a* contacts exactly with the magnetic tape 1 the vertical synchronizing pulses are reproduced. The point of this reproducing is indicated by the reference numeral 19 in FIGURE 2, and in FIGURE 2 a line connecting this point with the center of rotary shaft 10 is referred to as a standard line 20. Thus, it will be apparent that the magnetic head element 12*a* maintains contact with the magnetic tape 1 over an angle of revolution $\theta$ of 180° from the line 20.

In the illustrated structure the disk 21 is mounted on the rotary shaft 10 and has white paint laid on the sector of its peripheral surface subtending an angle of 180° and has black paint on the remaining sector of its surface. In this case, the boundary lines 23 between the white and black painted surfaces 22*a* and 22*b* are positioned to correspond to positions of the magnetic head elements 12*a* and 12*b*. That is, if the magnetic head element 12*a* is at a position corresponding to the revolution angle $\theta$ from the standard line 20, the point 23 is also at the angle $\theta$ from the standard line 20 of the disk 21. As is apparent from FIGURE 2, light beam 26 is applied from a light source 24 onto the disk periphery at the position of the standard line 20, through a lens 25, if necessary, and reflected light 27 therefrom is collected by a photo-electric converter, namely the photocell 29 through a lens 28.

Figure 4:
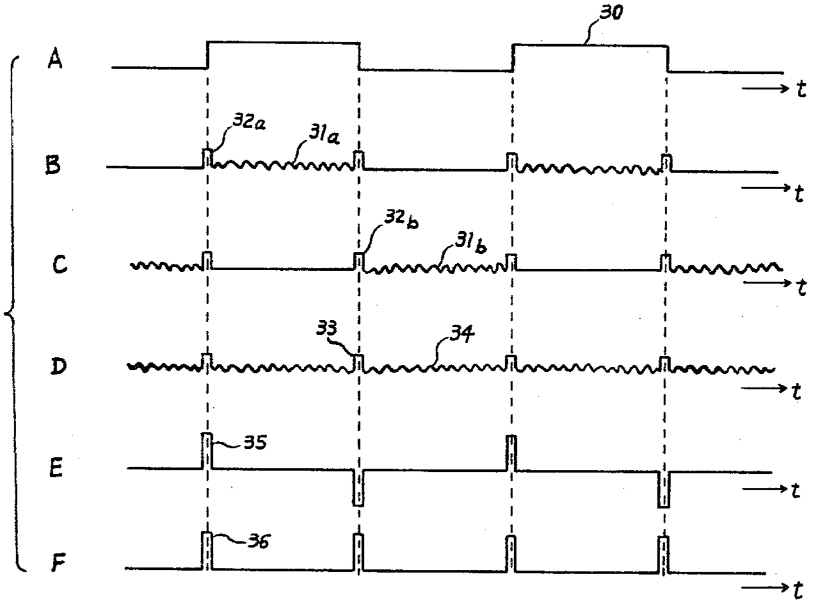
FIGURE 4 shows a series of waveforms for explaining the operation of the system of this invention.

In accordance with the above described construction, at an output end of the photocell can be picked up a rectangular wave electric output 30 as shown in FIGURE 4A, having a first amplitude during impingement of the light on the white painted surface 22*a* and having a lesser amplitude when the light impinges on the black painted surface 22*b*. The frequency of this electric output is one cycle for every revolution of the rotary shaft, and accordingly of the rotary magnetic head elements 12*a* and 12*b*.

On the other hand, the rotary magnetic head elements 12*a* and 12*b* reproduce picture signals at every half revolution, which signals have a phase angle of 180° to each other. Curves 31*a* and 31*b* in FIGURES 4B and C show the reproduced picture signals respectively by the magnetic head elements 12*a* and 12*b*. Vertical signals 32*a* and 32*b* contained in these picture signals 31*a* and 31*b* are positioned at the leading and trailing edges of the rectangular wave pulse 30.

Thus the reproduced picture signals are respectively those reproduced from the recorded signals 2 on each track illustrated in FIGURE 1, and by joining them together, a series of picture signals 34 having the vertical synchronizing signals 33 as shown in FIGURE 4D are obtained.

It will be apparent that since in point of time the leading and trailing edges of the rectangular wave signals 30 correspond exactly to the vertical synchronizing signals 33 occurring between picture signals 34, the rectangular wave signals 30 may be employed as vertical synchronizing signals. Accordingly, the rectangular wave signals 30 are added to a differentiation circuit 63, FIGURE 7, so as to obtain differentiated pulses 35 at the leading and trailing edges of the signals 30 as shown in FIGURE 4E, which pulses are fed to a polarity divider 64 to be divided into positive differentiated pulses and negative differentiated ones, and either one of the two series of pulses is then inverted at 65. The inverted and non-inverted series of pulses are then fed to a composing or synthesizing circuit 66 thereby obtaining a single series of pulses 36 as illustrated in FIGURE 4F. The period of the differentiated pulses 36 is exactly the same as that of the vertical synchronizing pulses 33 and the two series of pulses correspond to each other in point of time. Therefore, by adequately shaping such differentiated pulses 36 they may be substituted for the reproduced synchronizing signals obtained from the magnetic tape 1.

Accordingly, if the synchronizing signals reproduced from the tape 1 are considered as first synchronizing signals and the signals obtained by shaping the series of pulses 36 in FIGURE 4F are considered as second synchronizing signals, the second synchronizing signals can be employed when reproducing the picture signals by means of a picture tube.

Needless to say the relationship between the rotation of the rotary magnetic head member 9 and the movement of the magnetic tape 1 is controlled by a servo-system during the aforesaid reproducing operation.

Figure 5:
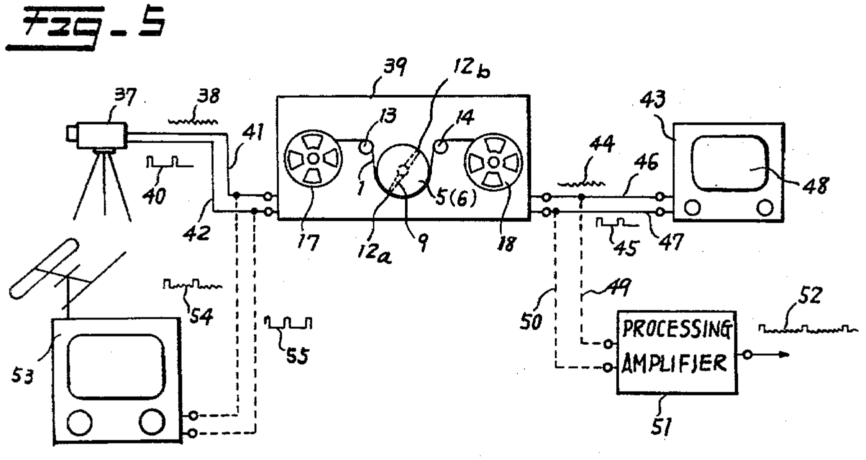
FIGURE 5 is a schematic diagram of an embodiment of a video tape recorder system in accordance with this invention.

FIGURE 5 is an explanatory diagram showing one embodiment of this invention employed in a closed circuit television system wherein 37 is a camera device and picture signals 38 therefrom are supplied to the magnetic recording device 39 to be recorded on the magnetic tape 1. In this instance, there being no need of having vertical synchronizing signals with the picture signals 38, the picture signals 38 and vertical synchronizing signals 40 are taken out from the camera tube and supplied to the recorder 39 through respectively different lines 41 and 42. The servo-system of the recording system (not shown in the figure) is controlled by the vertical synchronizing signals 40. In the recorder 39, parts corresponding to those in FIGURE 2 are marked with the same reference numerals, so that their functions will be clear from the previous description.

Thus recorded picture signals are reproduced and fed to a television receiver 43. In this case, to the receiver 43 are supplied reproduced picture signals 44 without vertical synchronizing signals, and the picture signals 44 and 45 are supplied to the receiver 43 through respectively different lines 46 and 47. The second synchronizing signals 45 are used as vertical synchronizing signals for vertical synchronization of a picture tube 48 of the receiver 43 so as to produce properly synchronized reproduced pictures. Consequently, in the receiver in this instance, a vertical synchronizing signal dividing circuit for separating reproduced vertical synchronizing signals from the picture signals is not required.

In such a closed circuit system no processing amplifier is required for putting the synchronizing signals into the picture signals to be recorded and reproduced, so that there is the great advantage that a very simple closed circuit system will be satisfactory. Furthermore, the second synchronizing signals 45 are not those recorded on the magnetic medium, and hence the cause of synchronizing stepout or break in conventional systems is completely avoided.

When it is desired to obtain picture signals composed by putting vertical synchronizing signals into the picture signals 44 (which may have no vertical synchronizing signal as reproduced in the device of FIGURE 5), the reproduced signals are fed to a processing amplifier 51 through lines 49 and 50 shown by the dotted lines in FIGURE 5 and at the output end of the amplifier can be obtained picture signals 52 having vertical synchronizing signals. Furthermore, when receiving and recording television transmitting waves, by adding vertical synchronizing signals 55 to the device 39 together with picture signals 54 (which include vertical synchronizing signals) produced in a television receiver 53 as illustrated in FIGURE 5, the recording is performed in exactly the same manner as when picture signals are obtained from the picture tube 37. The reproduced picture can easily be obtained by applying to a television receiver similar to receiver 53 the picture signals 44 and the second synchronizing signals 45 which were to be added to the receiver 43 in the previous explanation. In this instance, the magnetically reproduced first vertical synchronizing signals are included in the picture signals 44 supplied to the television receiver.

In the foregoing description I have explained the recording of picture signals on one magnetic track corresponding to a picture of one field or one frame, but it will be apparent that this invention may be applied to recording on one magnetic track picture signals corresponding to pictures of a plurality of fields or frames. In this case, a plurality of vertical synchronizing signals are recorded on one magnetic track, and the number of the painted surfaces of the rotary disk 21 is selected accordingly. In accordance with this invention, it is of course possible that the vertical synchronizing signals are recorded at the beginning of the magnetic tracks and at places corresponding thereto the rectangular waves are turned on and off; furthermore the vertical synchronizing signals are recorded at desired places on the magnetic tracks and the second synchronizing signals can be taken out by the rotary magnetic head member at the times when the vertical synchronizing signals are reproduced. However, when the vertical synchronizing signals on the magnetic medium do not exist at the beginning of the magnetic tracks there enter joints of the signals in the reproduced pictures, which is undesirable.

The device for obtaining the second synchronizing signals is not limited to the photoelectric converter; in some cases the rectangular wave signals are produced by combining a slip ring and a brush, from which the second synchronizing signals can be produced. Moreover, various modifications and variations can readily be made in accordance with the number of the magnetic head elements of the rotary magnetic head member.

*Summary of operation*

Figure 6:
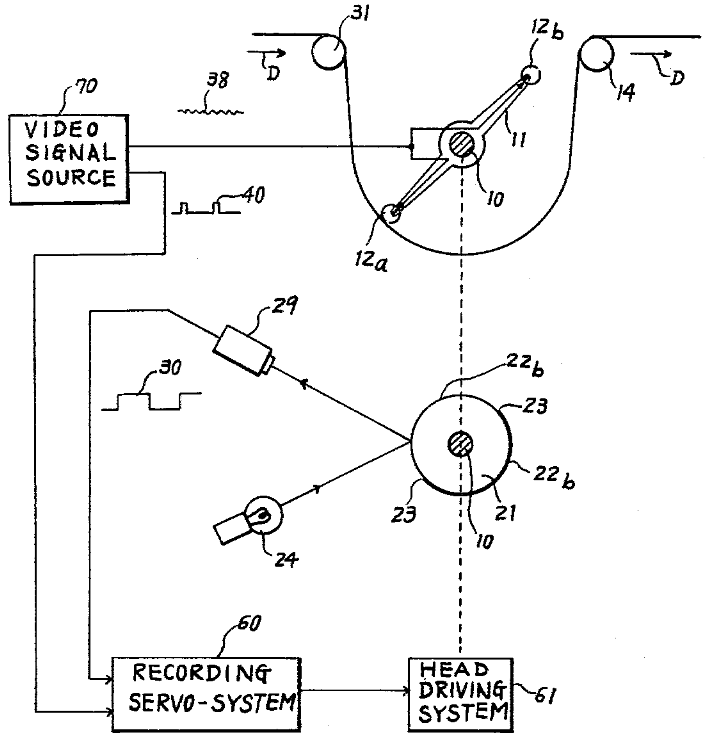
FIGURE 6 illustrates a recording circuit arrangement associated with the apparatus of FIGURES 2 and 3 for producing a recording as indicated in FIGURE 1.

During recording, picture signals which may include the horizontal and vertical synchronizing components are supplied from a video signal source 70 to the rotating heads 12*a* and 12*b* as diagrammatically indicated in FIGURE 6. The rotation of the heads 12*a* and 12*b* is synchronized with the vertical synchronizing signal from the source 70 through the medium of a recording servo-system 60 so that the successive heads begin a scan of the record medium at the instant when a vertical synchronizing signal is occurring. The speed of rotation of the heads may be such that the head 12*a* is at point 19 when a first vertical synchronizing signal occurs and is at point 71 when the next vertical synchronizing signal occurs. The resultant recording will then be as indicated in FIGURE 1 with the vertical synchronizing signals if supplied to the heads 12*a* and 12*b* being recorded at the beginning of the successive tracks 2, and a frame or field of the picture signal being recorded on a single track on the record medium. When the recording system is in proper synchronization, a vertical synchronizing signal from source 70 will arrive at the servo system 60 at the same time that the converter 29 is sensing a shift from one light condition to another at points 23 on the disk 21.

Figure 7:
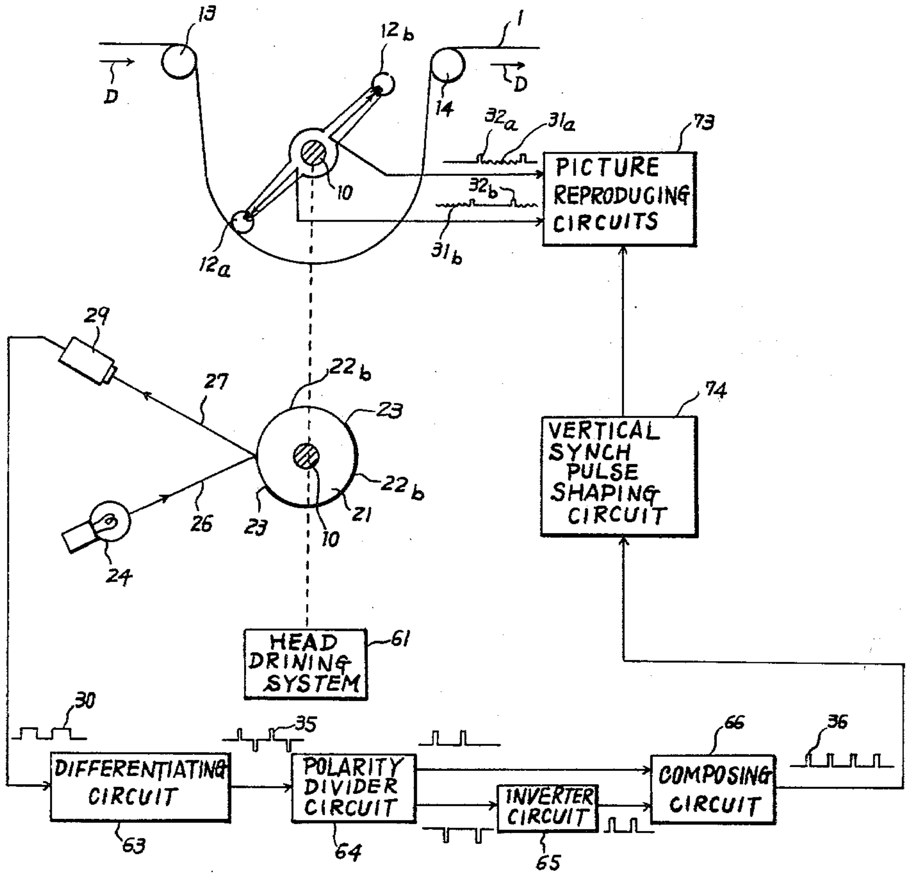
FIGURE 7 illustrates a reproducing circuit arrangement for the apparatus of FIGURES 2 and 3.

During playback, the heads 12*a* and 12*b* are driven at constant speed by the head driving system 61 and the reproduced signals from the heads are delivered to a picture reproducing circuits component 73, FIGURE 7. The signals from the successive scanning operations may be as indicated in FIGURES 4B and 4C including vertical synchronizing signals 32*a* and 32*b*. The converter element 29 may generate a square wave as indicated at 30 which shifts from one amplitude level to the other at instants of time corresponding to the occurrence of the vertical synchronizing signals reproduced by the head. The square wave signal 30 of FIGURE 4A is supplied to a differentiating circuit 63 to produce a pulse waveform 35 as indicated in FIGURE 4E. This waveform is converted to the waveform indicated in FIGURE 4F by means of a polarity divider circuit 64, and inverter circuit 65 and a synthesizing circuit 66 shown in FIGURE 7. By proper shaping of the pulses 36 by means of a pulse shaping circuit 74, FIGURE 7, these pulses may be substituted for the reproduced vertical synchronizing pulses from the tape 1 and will give a more reliable synchronization of the reproduced signal than is possible by relying on the reproduced vertical synchronizing pulses from the tape.

As indicated in FIGURE 5, the video signal source 70 of FIGURE 6 may comprise a television camera tube 37 or a television receiving set 53. The picture signal circuits component 73 of FIGURE 7 may be incorporated in a closed circuit television receiver 43 so that the receiver need not be equipped to segregate the vertical synchronizing signal reproduced from the tape 1. In fact, the vertical synchronizing signal need not be recorded on the tape 1, so long as the field is recorded in a proper manner along the track 2 so as to bear a constant relationship to the width dimension of the tape 1. Alternatively, a processing amplifier 51, FIGURE 5, may receive the output from the scanning heads and from the synthesizing circuit 66 to produce a complete television signal as indicated at 52 in FIGURE 5 including the vertical synchronizing component which has been artificially produced by converter 29 rather than being recorded on the tape and then reproduced therefrom.

It will be apparent to those in the art that many modifications and variations may be effected without departing from the scope of the novel concepts of this invention.

I claim as my invention:

1. The method of transducing intelligence comprising an information signal requiring periodic synchronizing signals which comprises (a) periodically physically moving a scanning means across the width dimension of a longitudinally moving record medium to record successive tracks extending transversely across the record medium, (b) synchronizing the period of the physical transverse scanning movements of the scanning means across the record medium with the period of said synchronizing signals while supplying the information signal to the scanning means for recording along the successive tracks on the record medium so that each of the required synchronizing signals occurs in time while the scanning means is scanning at a predetermined position with respect to the width dimension of the record medium for each of a plurality of recorded tracks on the record medium with the predetermined positions at said plurality of recorded tracks being in longitudinal alignment in the direction of movement of the record medium, (c) thereafter periodically transversely moving the scanning means across the width dimension of the longitudinally moving record medium to scan the successive transversely extending recorded tracks thereon to reproduce the information signals from the successive tracks, (d) generating synchronizing signals by means of a synchronizing signal generator moving in synchronism with the physical movement of the scanning means during reproduction of the recorded tracks with the generation of the synchronizing signals by the synchronizing signal generator being coordinated with the movement of the scanning means so that the synchronizing signals are generated while the scanning means is scanning each of said predetermined positions with respect to the width dimension of the record medium at said plurality of recorded tracks on the record medium, and (e) combining the information signal reproduced by the scanning means from the record medium with the periodic synchronizing signals generated by the synchronizing signal generating means to provide a composite intelligence signal.

2. The method of transducing a composite television signal comprising a series of fields each including a picture signal and a vertical synchronizing signal which comprises (a) driving a rotary transducer head at a speed synchronized with the period of said vertical synchronizing signals and supplying the picture signal to the head during rotary movement thereof in scanning relation to a moving record medium to record the fields of the television signal as successive tracks each extending transversely across the record medium with the positions on each of the successive tracks corresponding in time to the time of occurrence of said synchronizing signals in the composite television signal being in alignment with respect to the direction of movement of the record medium, (b) scanning the transversely extending recorded tracks by means of a rotary transducer head during reproduction, (c) generating synchronizing signals during reproduction in response to the rate of rotation of said transducer head and at points in time when said transducer head is at said positions on the successive tracks and independently of any scanning contact of the transducer head with the record medium, and (d) electrically combining said synchronizing signals generated in response to the rate of rotation of the transducer head with the picture signal reproduced by the transducer head during reproduction to provide a composite television signal.

3. The method of transducing a composite television signal comprising a series of fields each including a picture signal and a vertical synchronizing signal which comprises (a) moving a record medium along a record medium path with the record medium having the successive fields of the television signal recorded as successive tracks extending transversely to the direction of movement of the record medium and with corresponding parts of the successive fields recorded on the record medium being in alignment with respect to the direction of movement of the record medium, (b) scanning the transversely extending recorded tracks by means of a rotary transducer head to electrically reproduce the successive recorded fields, (c) rotating a pulse generating means in synchronism with rotation of the transducer head during reproduction of the recorded tracks to generate synchronizing signals for the reproduced series of fields, and (d) electrically combining the synchronizing pulses generated by the rotating pulse generating means with the series of fields reproduced by the transducer head to provide a composite television signal.

4. Apparatus for reproducing a composite television signal recorded on a magnetic record medium with the successive fields of the television signal being recorded as successive tracks on the record medium extending transversely to the direction of movement of the record medium comprising (a) rotary transducer head means disposed transversely relative to the direction of movement of the record medium for scanning the successive transversely extending recorded tracks on the record medium during movement of the record medium in a longitudinal direction to electrically reproduce the series of fields recorded on the record medium, (b) a vertical synchronizing signal generator for generating vertical synchronizing signals independently of scanning contact of the rotary transducer head means with the record medium, (c) means for driving the generating means in synchronism with the rotary movement of the rotary transducer head means to generate vertical synchronizing signals coordinated with the generation of the successive fields by the rotary transducer head means, and (d) means for electrically combining the electric signal from the rotary transducer head means representing the series of fields recorded on the record medium with the vertical synchronizing signals generated by the generating means independently of scanning contact with the record medium to provide a composite television signal.

5. A magnetic reproducing system comprising (a) a magnetic tape having video signals recorded along successive lines extending obliquely to the direction of movement of the tape with the video signals recorded in such a way that the vertical synchronizing portions thereof occur at a uniform position along one side margin of the tape, (b) means for guiding said tape in its movement along a predetermined path, (c) a plurality of rotary magnetic heads, (d) means mounting said heads for successive scanning movements across the tape along the obliquely extending lines recorded thereon to reproduce the recorded video signals, (e) means coupled to said mounting means for generating synchronizing pulses in accordance with the rotary movement of said magnetic heads to generate a synchronizing pulse each time one of the heads scans a vertical synchronizing position at one side margin of the tape, and (f) means connected to said generating means for utilizing said synchronizing pulses to control vertical deflection of a scanning beam during visual reproduction of the recorded video signals.

6. A magnetic reproducing system comprising (a) a magnetic tape having information signals recorded thereon requiring synchronizing signals for proper reproduction thereof, (b) a cylindrical guide member for guiding the magnetic tape comprising a pair of cylinders having an air-gap therebetween over which the magnetic tape is guided, (c) a rotary arm, (d) a plurality of magnetic heads mounted on said rotary arm for movement in the air gap between said cylindrical guide members in scanning contact with the magnetic tape, (e) a disk coupled for rotation with said rotary arm, (f) said disk having surfaces of different light reflective factors disposed on the periphery thereof and arranged in accordance with the arcuate intervals between the successive magnetic heads mounted on said arm, (g) a projector for projecting light onto the periphery of said disk, (h) a photoelectric converter for receiving reflected light from said surfaces of different light reflection factors at the periphery of said disk and for converting the light variations received into corresponding electric signals of rectangular waveform, and (i) means coupled to said converter for generating pulses at the leading and trailing edges of the rectangular waveform for use in synchronizing the reproduced information signals from the tape.

7. A magnetic reproducing system comprising (a) a magnetic tape on which information signals such as video signals or the like requiring synchronizing signals are recorded obliquely at some angle to the advance direction of the tape, (b) a cylindrical guide member for guiding said magnetic tape, said cylindrical guide member being composed of two cylinders to form an air-gap of a certain width therebetween and (c) the magnetic tape being guided over the air-gap with some inclination to the axis of the cylindrical guide member, (d) two rotary arms mounted on a rotary shaft with an angle relation of 180° to each other, (e) two rotary magnetic heads which are respectively mounted on said rotary arms and rotate in contact with said magnetic tape in the air-gap formed by said two cylinders, (f) a disk mounted on the rotary shaft of said rotary arms, (g) said disk having surfaces of different light reflection factors according to arc intervals between said two magnetic heads, (h) a projector for projecting light to said disk, (i) a photoelectric converter which receives the reflected light from said surfaces of different light reflection factors of said disk and converts the light into electric energy of rectangular waveform, and (j) means for generating pulses corresponding to the leading and trailing edges of said rectangular waveform, (k) said pulses being utilized as synchronizing signals for the information signals.

8. A magnetic recording and reproducing system comprising (a) a television camera device, (b) a video tape recorder having movable head means for scanning a magnetic tape during recording and reproducing operations, (c) first means connected from said device to said recorder for applying picture signals exclusive of vertical synchronizing signals from said television camera device to the video tape recorder, (d) second means connected with said camera device for supplying only vertical synchronizing signals, (e) a servo-system connected to said second means and controlled by said vertical synchronizing signals for effecting synchronous operation of said video tape recorder, (f) third means coupled to the movable head means of said recorder for receiving reproduced picture signals without vertical synchronizing signals from said head means, (g) means mechanically coupled to said movable head means for generating vertical synchronizing signals for the picture signals reproduced by the head means of said tape recorder, and (h) a television receiver coupled to said third means for receiving said reproduced picture signals and coupled to said generating means for receiving said vertical synchronizing signals to synchronize the reproduction of the recorded picture signals.

References Cited by the Examiner

UNITED STATES PATENTS

| | | | |
|---|---|---|---|
| 2,645,971 | 7/53 | Herbst | 178—6 |
| 2,912,493 | 11/59 | Crooks et al. | 178—6.8 |
| 2,965,708 | 12/60 | Witt | 178—6.6 |
| 3,030,438 | 4/62 | Newell | 178—5.4 |

FOREIGN PATENTS

| | | |
|---|---|---|
| 833,278 | 4/60 | Great Britain. |

DAVID G. REDINBAUGH, *Primary Examiner.*

STEPHEN W. CAPELLI, *Examiner.*